United States Patent
Yoon et al.

(10) Patent No.: US 11,961,956 B2
(45) Date of Patent: Apr. 16, 2024

(54) CYLINDRICAL SECONDARY BATTERY MODULE AND METHOD FOR PRODUCING CYLINDRICAL SECONDARY BATTERY MODULE

(71) Applicant: LG CHEM, LTD., Seoul (KR)

(72) Inventors: Ji-Su Yoon, Daejeon (KR); Su-Chang Kim, Daejeon (KR); Jae-Min Yoo, Daejeon (KR); Jae-Uk Ryu, Daejeon (KR); Dal-Mo Kang, Daejeon (KR); Jeong-O Mun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 568 days.

(21) Appl. No.: 16/497,721

(22) PCT Filed: Jul. 24, 2018

(86) PCT No.: PCT/KR2018/008365
§ 371 (c)(1),
(2) Date: Sep. 25, 2019

(87) PCT Pub. No.: WO2019/074193
PCT Pub. Date: Apr. 18, 2019

(65) Prior Publication Data
US 2020/0035967 A1 Jan. 30, 2020

(30) Foreign Application Priority Data
Oct. 10, 2017 (KR) .................. 10-2017-0129093

(51) Int. Cl.
*H01M 10/04* (2006.01)
*H01M 50/213* (2021.01)
*H01M 50/271* (2021.01)

(52) U.S. Cl.
CPC ..... *H01M 10/0422* (2013.01); *H01M 50/213* (2021.01); *H01M 50/271* (2021.01); *H01M 2200/00* (2013.01); *H01M 2220/20* (2013.01)

(58) Field of Classification Search
CPC ....... H01M 50/20–598; H01M 50/271; H01M 50/289; H01M 50/317; H01M 50/383;
(Continued)

(56) References Cited

U.S. PATENT DOCUMENTS

2006/0159984 A1 7/2006 Nagayama et al.
2008/0268328 A1 10/2008 Lee et al.
(Continued)

FOREIGN PATENT DOCUMENTS

CN 105280983 A 1/2016
CN 206210865 U 5/2017
(Continued)

OTHER PUBLICATIONS

International Search Report issued in PCT/KR2018/008365 (PCT/ISA/210), dated Nov. 22, 2018.
(Continued)

*Primary Examiner* — Milton I Cano
*Assistant Examiner* — Mary G Henshaw
(74) *Attorney, Agent, or Firm* — Birch, Stewart, Kolasch & Birch, LLP

(57) ABSTRACT

A cylindrical secondary battery module includes: a plurality of cylindrical secondary battery cells respectively having a battery case in which an electrode assembly and an electrolyte are accommodated; a cell frame at which the plurality of cylindrical secondary battery cells are disposed; and a lid coupled to the cell frame and having a flame outlet. The cell frame includes: a plurality of plate members bent and coupled to intersect each other; and a space formed between
(Continued)

the plurality of plate members so that the cylindrical secondary battery cells are disposed therein.

8 Claims, 5 Drawing Sheets

(58) Field of Classification Search
CPC ............ H01M 50/469; H01M 50/477; H01M 50/463; H01M 50/46; H01M 10/643; H01M 10/123; H01M 10/0422; H01M 2200/00; H01M 2220/20; H01M 50/213; H01M 2200/20
USPC .......................................................... 429/99
See application file for complete search history.

(56) References Cited

U.S. PATENT DOCUMENTS

| | | | |
|---|---|---|---|
| 2009/0104516 A1* | 4/2009 | Yoshihara | H01M 50/502 |
| | | | 429/149 |
| 2009/0111015 A1* | 4/2009 | Wood | H01M 10/12 |
| | | | 429/164 |
| 2010/0330404 A1 | 12/2010 | Nishino et al. | |
| 2011/0097617 A1* | 4/2011 | Gu | H01M 10/613 |
| | | | 429/120 |
| 2011/0151311 A1 | 6/2011 | Lee et al. | |
| 2011/0217587 A1 | 9/2011 | An et al. | |
| 2013/0071705 A1* | 3/2013 | Frutschy | H01M 50/224 |
| | | | 429/62 |
| 2013/0130084 A1* | 5/2013 | Hamada | H01M 10/6563 |
| | | | 429/99 |
| 2013/0183566 A1 | 7/2013 | Wayne et al. | |
| 2013/0209858 A1 | 8/2013 | Schmitt et al. | |
| 2014/0234686 A1 | 8/2014 | Sweney et al. | |
| 2014/0322566 A1 | 10/2014 | Kim | |
| 2017/0098805 A1 | 4/2017 | Liu et al. | |
| 2018/0013102 A1* | 1/2018 | Iizuka | H01M 50/119 |
| 2019/0386264 A1* | 12/2019 | Wynn | H01M 50/213 |
| 2021/0184190 A1* | 6/2021 | Lee | H01M 50/20 |

FOREIGN PATENT DOCUMENTS

| | | |
|---|---|---|
| CN | 107170935 A | 9/2017 |
| CN | 206490115 U | 9/2017 |
| JP | 2000-268791 A | 9/2000 |
| JP | 2007-149560 A | 6/2007 |
| JP | 2018-73794 A | 5/2018 |
| KR | 10-2006-0083127 A | 7/2006 |
| KR | 10-2006-0103630 A | 10/2006 |
| KR | 10-0839374 B1 | 6/2008 |
| KR | 10-2010-0123828 A | 11/2010 |
| KR | 10-2011-0099979 A | 9/2011 |
| KR | 10-2012-0129968 A | 11/2012 |
| KR | 10-1574081 B1 | 12/2015 |
| WO | WO-2019028513 A1 * | 2/2019 |

OTHER PUBLICATIONS

Extended European Search Report, dated Jun. 9, 2020, for European Application No. 18867187.9.

* cited by examiner

CYLINDRICAL SECONDARY BATTERY MODULE AND METHOD FOR PRODUCING CYLINDRICAL SECONDARY BATTERY MODULE

TECHNICAL FIELD

The present application claims priority to Korean Patent Application No. 10-2017-0129093 filed on Oct. 10, 2017 in the Republic of Korea, the disclosures of which are incorporated herein by reference.

The present disclosure relates to a cylindrical secondary battery module and a method for producing a cylindrical secondary battery module, and more particularly, to a cylindrical secondary battery module and a method for producing a cylindrical secondary battery module, which may prevent a flame occurring at a secondary battery cell from spreading and allow easy fabrication of a cell frame at which cylindrical secondary battery cells are disposed.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes a secondary battery cell in which a positive electrode plate and a negative electrode plate, respectively coated with the positive electrode active material and the negative electrode active material, are arranged with a separator therebetween, and an exterior, that is a battery case, which seals and receives the secondary battery cell together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

In general, the secondary battery may be classified into a cylindrical type, a rectangular type and a pouch type depending on the shape of the exterior in which the secondary battery cells are accommodated, and the cylindrical secondary battery may be used in the form of a secondary battery module by connecting a plurality of secondary battery cells in series or in parallel.

In a conventional cylindrical secondary battery module, if one secondary battery cell is ignited, the flame spreads from the ignited secondary battery cell to neighboring secondary battery cells, so that all the secondary battery cells are ignited sequentially.

In addition, in the conventional cylindrical secondary battery module, a cylindrical insert hole corresponding to the shape of the cylindrical secondary battery is formed in the frame into which the cylindrical secondary battery is inserted, but it is not easy to manufacture a frame having the cylindrical insertion hole.

DISCLOSURE

Technical Problem

The present disclosure is directed to providing a cylindrical secondary battery module and a method for producing a cylindrical secondary battery module, which may prevent a flame of one secondary battery cell from spreading to other neighboring secondary battery cells even though any one secondary battery cell is ignited.

In addition, the present disclosure is directed to providing a cylindrical secondary battery module and a method for producing a cylindrical secondary battery module, which may allow easy fabrication of a cell frame at which the cylindrical secondary battery cells are disposed.

Technical Solution

In one aspect of the present disclosure, there is provided a cylindrical secondary battery module, comprising: a plurality of cylindrical secondary battery cells respectively having a battery case in which an electrode assembly and an electrolyte are accommodated; a cell frame at which the plurality of cylindrical secondary battery cells are disposed; and a lid coupled to the cell frame and having a flame outlet, wherein the cell frame includes: a plurality of plate members bent and coupled to intersect each other; and a space formed between the plurality of plate members so that one of the plurality of cylindrical secondary battery cells is disposed therein.

Also, the plurality of plate members may include: a first cover bent to form at least one first space; and a second cover coupled to the first cover and bent to form at least one second space.

In addition, the first cover and the second cover may be coupled so that the at least one first space of the first cover and the at least one second space of the second cover are united to form a at least one third space, and the at least one third space is the space formed between the plurality of plate members so that one of the cylindrical secondary battery cells may be disposed in the third space.

Also, the at least one third space may have a polygonal shape.

In addition, the first cover may be bent so that a plurality of first spaces are successively formed with a same pattern, and the second cover may be bent so that a plurality of second spaces are successively formed with the same pattern.

Also, at least one first fitting groove may be formed at the first cover, at least one second fitting groove may be formed at the second cover, and the second cover may be coupled to the at least one first fitting groove by fitting, and the first cover may be coupled to the at least one second fitting groove by fitting.

In addition, the first cover and the second cover may be formed with a same shape, and the first cover and the second cover may be coupled so that the at least one first fitting groove of the first cover and the at least one second fitting groove of the second cover are disposed to face each other.

Also, the cell frame may be made of a mica material.

Meanwhile, in another aspect of the present disclosure, there is also provided a secondary battery pack including the cylindrical secondary battery module described above, and there is also provided a vehicle including the cylindrical secondary battery module.

Meanwhile, in another aspect of the present disclosure, there is also provided a method for producing a cylindrical secondary battery module, comprising: bending a first plate member to form a first cover so that at least one first space is provided therein; bending a second plate member to form a second cover so that at least one second space is provided therein; coupling the first cover and the second cover so that the at least one first space and the at least one second space are united to form at least one third space; and disposing a cylindrical secondary battery cell in the at least one third space.

Also, the method may further comprise: bending the first cover so that a plurality of first spaces are successively formed with a same pattern, and bending the second cover so that a plurality of second spaces are successively formed with the same pattern.

Advantageous Effects

According to embodiments of the present disclosure, even though any one secondary battery cell is ignited, the flame is discharged through a flame outlet formed at a lid, and thus it is possible to prevent the flame from spreading to other neighboring secondary battery cells.

In addition, since a polygonal cell frame may be fabricated just by bending and coupling a plurality of plate members, which configure the cell frame at which the cylindrical secondary battery cells are disposed, to intersect each other, the cell frame may be easily fabricated.

BEST MODE

Figure 1:
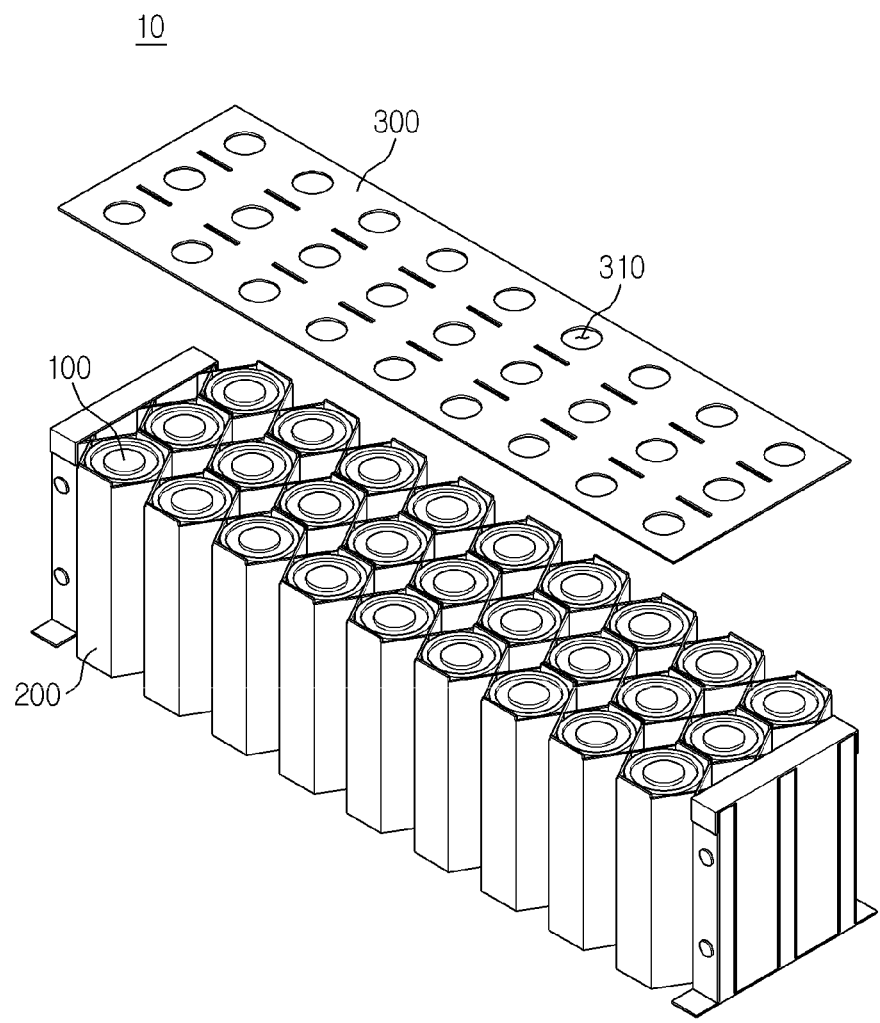
FIG. 1 is a schematic exploded perspective view showing a cylindrical secondary battery module according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
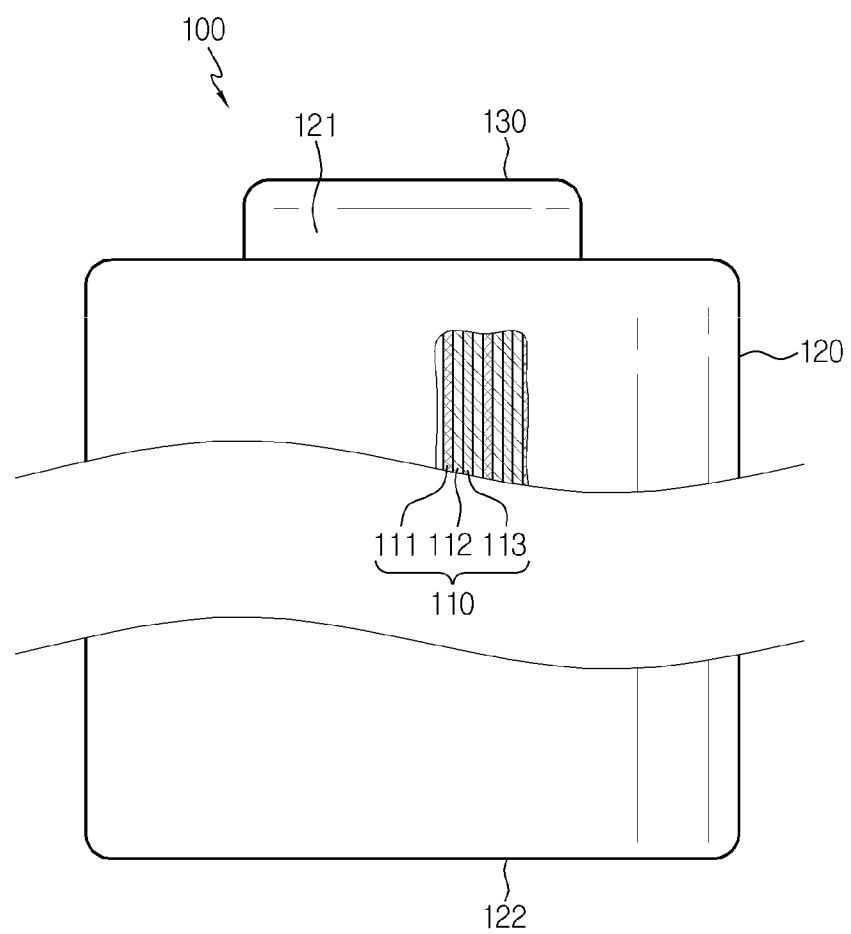
FIG. 2 is a partial cross-sectioned view showing a cylindrical secondary battery cell, employed at the cylindrical secondary battery module according to an embodiment of the present disclosure.
Figure 3:
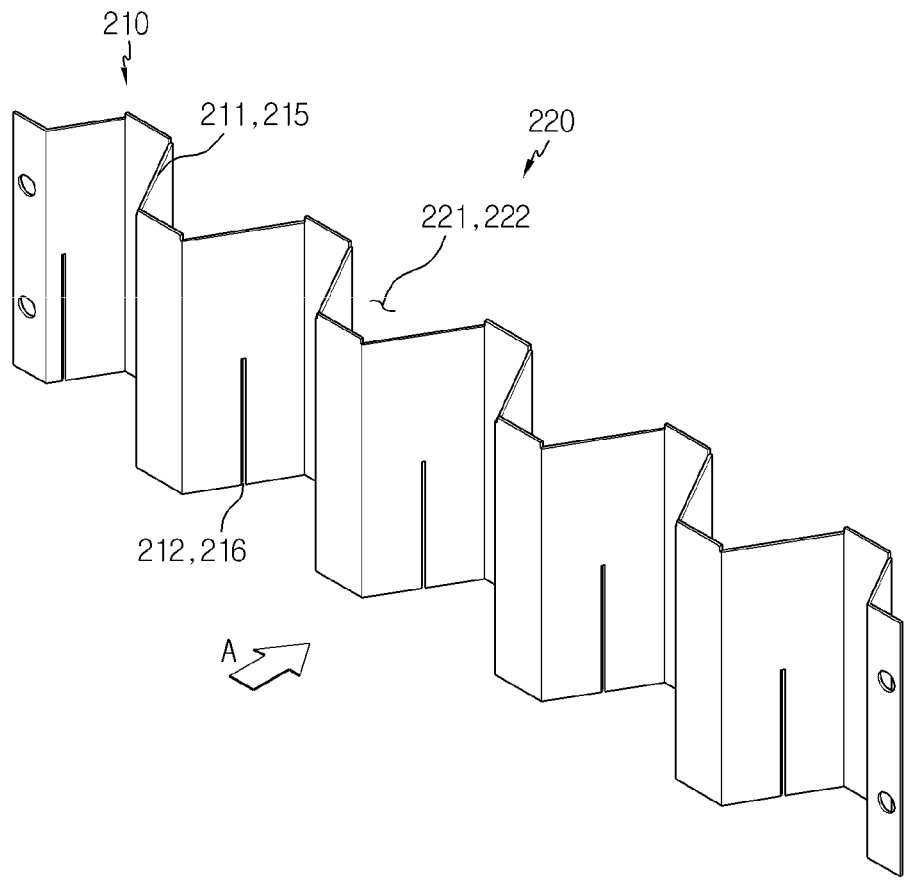
FIG. 3 is a perspective view showing a plate member of a cell frame, employed at the cylindrical secondary battery module according to an embodiment of the present disclosure.
Figure 4:
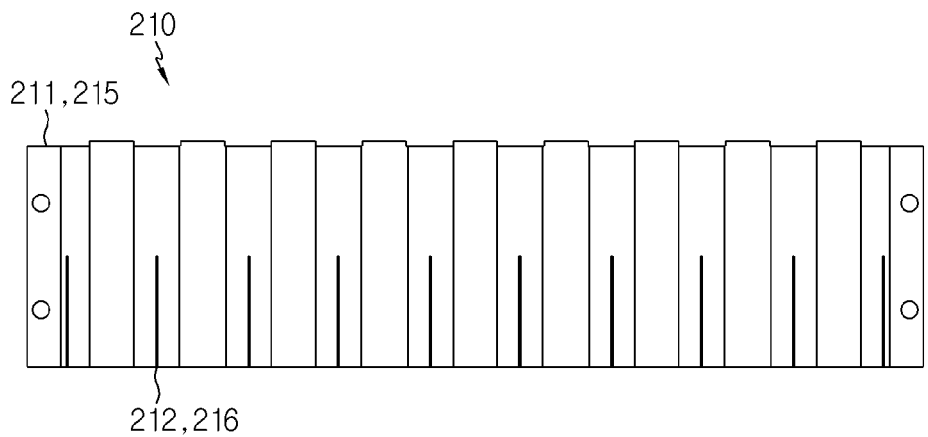
FIG. 4 is a diagram showing a plate member of FIG. 3, viewed along an arrow A.
Figure 5:
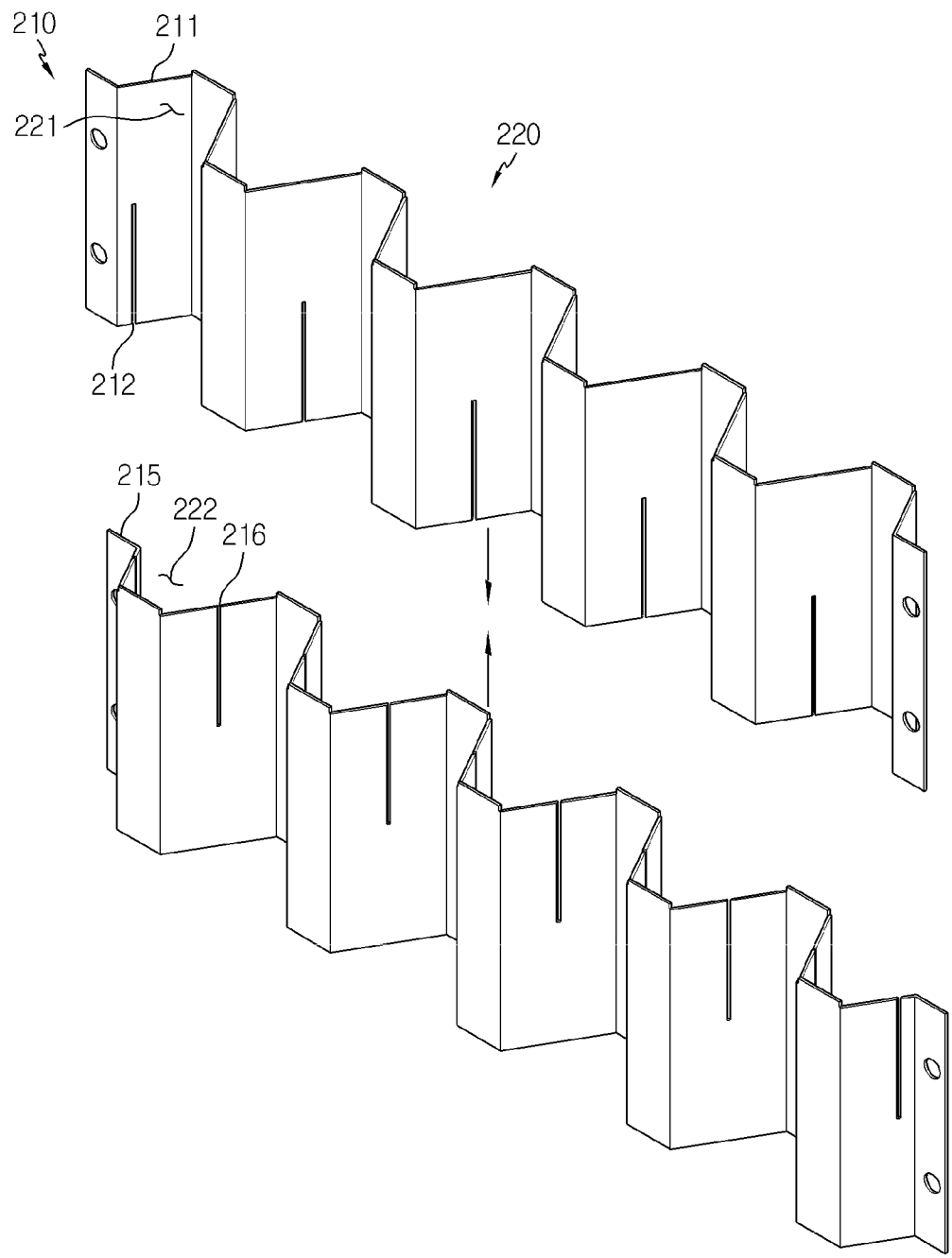
FIG. 5 is a perspective view showing that a first cover and a second cover are disposed at opposite sides to be coupled, at the cylindrical secondary battery module according to an embodiment of the present disclosure.
Figure 6:
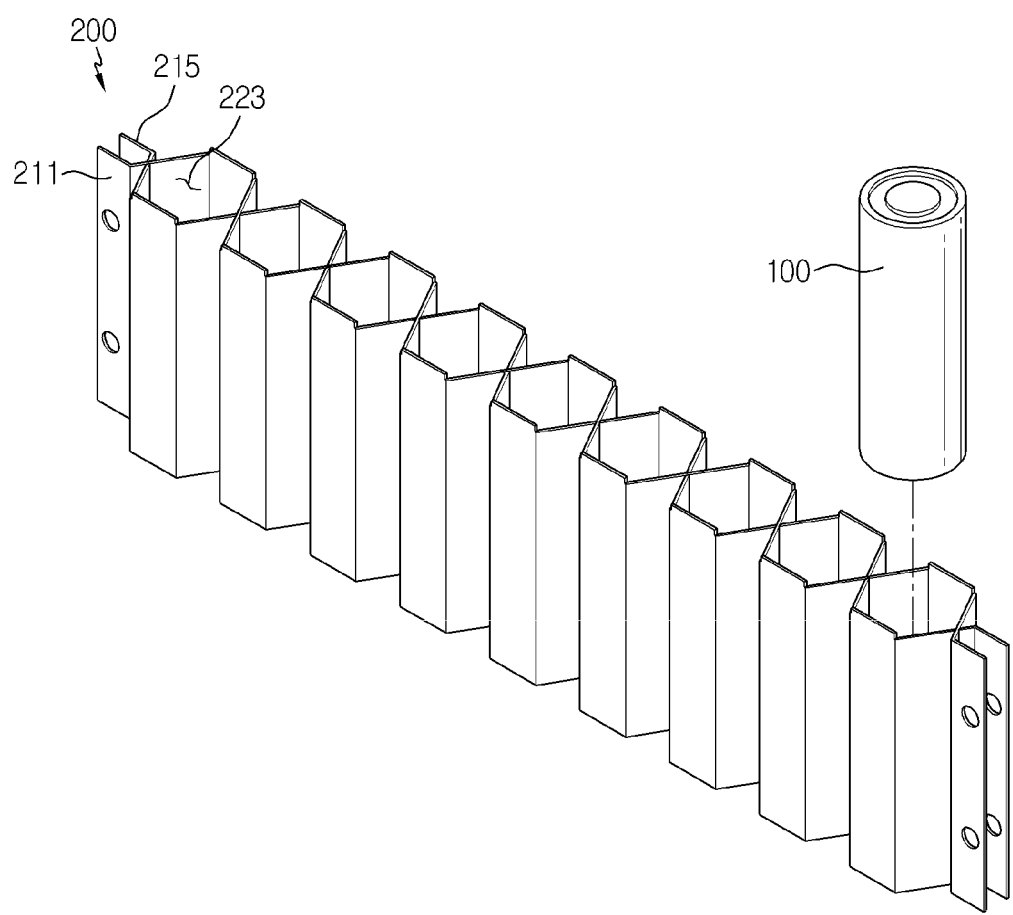
FIG. 6 is a perspective view showing that the first cover and the second cover of FIG. 5 are coupled to form a third space.

FIG. 1 is a schematic exploded perspective view showing a cylindrical secondary battery module according to an embodiment of the present disclosure, FIG. 2 is a partial cross-sectioned view showing a cylindrical secondary battery cell, employed at the cylindrical secondary battery module according to an embodiment of the present disclosure, FIG. 3 is a perspective view showing a plate member of a cell frame, employed at the cylindrical secondary battery module according to an embodiment of the present disclosure, FIG. 4 is a diagram showing a plate member of FIG. 3, viewed along an arrow A, FIG. 5 is a perspective view showing that a first cover and a second cover are disposed at opposite sides to be coupled, at the cylindrical secondary battery module according to an embodiment of the present disclosure, and FIG. 6 is a perspective view showing that the first cover and the second cover of FIG. 5 are coupled to form a third space.

Referring to FIGS. 1 to 6, a cylindrical secondary battery module 10 according to an embodiment of the present disclosure includes a plurality of cylindrical secondary battery cells 100, a cell frame 200, and a lid 300.

Referring to FIG. 2, the cylindrical secondary battery cell 100 includes an electrode assembly 110, for example a jelly-roll type electrode assembly 110, a cylindrical battery case 120 in which an electrolyte is accommodated together with the electrode assembly 110, and a positive electrode terminal 121 formed at, for example, an upper portion of the battery case 120, and a negative electrode terminal 122 formed at, for example, a lower portion of the battery case 120.

The electrode assembly 110 may have a structure in which a positive electrode 111, a negative electrode 113, and a separator 112 interposed between the positive electrode 111 and the negative electrode 113 are wound in a jelly-roll shape. A lead (not shown) of the positive electrode 111 may be attached to the positive electrode 111 and connected to a positive electrode terminal 121 at, for example, an upper side of the battery case 120. A lead (not shown) of the negative electrode 113 may be attached to the negative electrode 113 and connected to a negative electrode terminal 122 at, for example, a lower side of the battery case 120. In addition, a cylindrical center pin (not shown) may be inserted at a center portion of the electrode assembly 110. The center pin (not shown) fixes and supports the electrode assembly 110 and may function as a passage for discharging gas generated by internal reactions in charging, discharging and operating. Meanwhile, a safety vent (not shown) may be provided inside the battery case 120, for example at a lower portion of a top cap 130, so that the safety vent is broken due to a pressure rise inside the battery case 120 to discharge the gas.

The cell frame 200 is provided in various shapes such that a plurality of cylindrical secondary battery cells 100 are arranged. The cell frame 200 includes a plurality of plate members 210 and a space 220. The space 220 is formed between the plurality of plate members 210 by the plurality of plate members 210 so that the cylindrical secondary battery cells 100 may be respectively disposed therein. The plate members 210 are made of a thin plate and are bent at various portions. For example, referring to FIGS. 3 and 4, one plate member 210 may be bent so that the same pattern is successively formed. In this way, a first cover 211 may be formed by bending one plate member 210. Here, the first cover 211 may be bent so that at least one first space 221 is formed. By doing so, the first cover 211 may be bent so that a plurality of first spaces 221 are successively formed with the same pattern. In addition, a plate member 210 other than the plate member 210 forming the first cover 211 may be bent to provide a second cover 215. Here, the second cover 215 may be bent so that at least one second space 222 is formed. By doing so, the second cover 215 may be bent so that a plurality of second spaces 222 are successively formed with the same pattern. That is, the plurality of plate members 210 may be respectively bent to form the first cover 211 and the second cover 215, and the first cover 211 and the second cover 215 may be coupled to intersect each other.

A third space 223 (see FIG. 6) in which the secondary battery cells 100 are disposed is formed at the cell frame 200. That is, referring to FIGS. 5 and 6, the first cover 211 and the second cover 215 are coupled so that the first space 221 of the first cover 211 and the second space 222 of the second cover 215 are united. At this time, the first space 221 and the second space 222 are united to form a single closed third space 223. Here, the third space 223 may have various shapes and may have a polygonal shape. In addition, referring to FIGS. 1 and 6, the third space 223 may have a hexagonal shape. If the cell frame 200 is formed in a hexagonal shape as above, it is possible to successively arrange hexagons of the same size repeatedly, which facilitates fabrication and contributes to an increase in capacity of the secondary battery. However, the shape of the third space 223 is not limited to a hexagonal shape, and the third space 223 may be formed in various polygonal shapes as necessary.

At least one first fitting groove 212 may be formed at the first cover 211 of the cell frame 200, and at least one second fitting groove 216 may be formed at the second cover 215. Here, the first cover 211 and the second cover 215 may be formed in the same shape. If the first cover 211 and the second cover 215 are formed in the same shape, it is possible to manufacture both the first cover 211 and the second cover 215 with a single mold, thereby reducing the cost. The first cover 211 and the second cover 215 having the same shape may be disposed to face each other and coupled to each other. That is, the first cover 211 and the second cover 215 may be coupled so that the first fitting groove 212 of the first cover 211 and the second fitting groove 216 of the second cover 215 are disposed to face each other. This will be described with reference to FIG. 5. The first cover 211 is disposed above the second cover 215 so that the first fitting groove 212 of the first cover 211 is oriented toward the second cover 215 disposed therebelow, and the second cover 215 is disposed below the first cover 211 so that the second fitting groove 216 of the second cover 215 is oriented toward the first cover 211 disposed thereabove. Also, the first cover 211 and the second cover 215 are coupled so that the second cover 215 is fitted into the first fitting groove 212 and the first cover 211 is fitted into the second fitting groove 216. If the first cover 211 and the second cover 215 are coupled in this way, as shown in FIG. 6, the first space 221 and the second space 222 are united to form a single closed third space 223. Also, as shown in FIG. 1, the secondary battery cell 100 may be disposed in the third space 223.

The cell frame 200 may be made of various materials, for example a mica with a low heat transfer rate. Since mica has a very low heat transfer rate even at a high temperature, it is possible to insulate any one secondary battery cell 100 from other neighboring secondary battery cells 100 even at ordinary time when the flame is not generated at the cylindrical secondary battery cell 100. In addition, if a flame is generated in a specific secondary battery cell 100 due to various causes, the cell frame 200 made of mica prevents the flame from spreading. Thus, even though a specific secondary battery cell 100 is ignited, it is possible to prevent the flame from spreading to other neighboring secondary battery cells 100 sequentially. However, the material of the cell frame 200 is not limited to mica, and various materials may be used as long as it is possible to prevent the flame occurring at a specific secondary battery cell 100 from spreading. The lid 300 is coupled to the cell frame 200 and has a flame outlet 310. Since the secondary battery cell 100 is disposed in the third space 223 of the cell frame 200, for example the cell frame 200 made of mica, if any one secondary battery cell 100 is ignited, the flame is blocked by the cell frame 200 not to spread in a lateral direction, and thus the flame is discharged through the flame outlet 310 of the lid 300 coupled to the cell frame 200. At this time, the lid 300 may also be made of mica. Also, since the flame discharged through the flame outlet 310 of the lid 300 is discharged upward without moving in a lateral direction based on FIG. 1, it is possible to prevent the flame from spreading to other secondary battery cells 100. However, the material of the lid 300 is not limited to mica, and various materials may be used as long as it is possible to prevent the flame occurring at a specific secondary battery cell 100 from spreading. As shown in FIG. 1, the lid 300 may be coupled to the cell frame 200 at, for example, an upper side of the cell frame 200.

Hereinafter, the operation and effect of the cylindrical secondary battery module 10 according to an embodiment of the present disclosure will be described with reference to the drawings.

Referring to FIGS. 1 to 6, the cell frame 200 is formed by coupling the first cover 211 and the second cover 215, which are prepared by bending the plate member 210, and the space 220 having a polygonal shape, for example a hexagonal shape, is formed at the cell frame 200 so that the secondary battery cell 100 may be inserted therein. The first cover 211 and the second cover 215 of the cell frame 200 are formed in the same shape and are bent to form the same pattern successively and repeatedly, and the first fitting groove 212 and the second fitting groove 216 may formed to be coupled so that the first cover 211 and the second cover 215 are coupled. By doing so, the cell frame 200 may be fabricated just by fitting the first cover 211 and the second cover 215 respectively into the first fitting groove 212 and the second fitting groove 216, and thus the cell frame 200 may be easily fabricated. Meanwhile, the cell frame 200 may be made of a mica material with a low heat transfer rate. Since the lid 300 made of a mica material and having the flame outlet 310 formed therein is coupled to the cell frame 200, even though a flame is generated at any one secondary battery cell 100, the flame may be prevented from spreading by means of the cell frame 200 made of a mica material and the lid 300 made of a mica material. In addition, since the flame is discharged through the flame outlet 310 of the lid 300 in a direction in which the secondary battery cells 100 are not disposed, it is possible to prevent the secondary battery cells 100 from being ignited sequentially.

Meanwhile, a secondary battery pack (not shown) according to an embodiment of the present disclosure may include one or more secondary battery modules according to an embodiment of the present disclosure as described above. Also, in addition to the secondary battery modules, the secondary battery pack (not shown) may further includes a case for accommodating the secondary battery modules, and various devices for controlling charge and discharge of the secondary battery modules, such as a BMS, a current sensor, a fuse, and the like.

Meanwhile, a vehicle (not shown) according to an embodiment of the present disclosure may include the secondary battery module or the secondary battery pack (not shown) described above, and the secondary battery pack (not shown) may include the secondary battery module. In addition, the secondary battery module according to an embodiment of the present disclosure may be applied to the vehicle (not shown), for example, a predetermined vehicle (not shown) provided to use electricity like an electric vehicle or a hybrid electric vehicle.

Hereinafter, a method for producing the cylindrical secondary battery module 10 according to an embodiment of the present disclosure will be described. Here, features identical to the cylindrical secondary battery module 10 according to an embodiment of the present disclosure will not be described in detail again.

First, the plate member 210 is bent to form the first cover 211 so that at least one first space 221 is formed therein. Here, the first cover 211 may be bent so that a plurality of first spaces 221 are successively formed with the same pattern. In addition, the plate member 210 is bent to form the second cover 215 so that at least one second space 222 is formed therein. Here, the second cover 215 may be bent so that a plurality of second spaces 222 are successively formed with the same pattern. In addition, the first cover 211 and the second cover 215 are coupled such that the first space 221 and the second space 222 are united to form a single closed third space 223. In addition, the cylindrical secondary battery cell 100 is disposed in the third space 223.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure is directed to a cylindrical secondary battery module and a method for manufacturing the cylindrical secondary battery module and is particularly applicable to industries associated with a secondary battery.

What is claimed is:

1. A cylindrical secondary battery module, comprising:
a plurality of cylindrical secondary battery cells respectively having a battery case in which an electrode assembly and an electrolyte are accommodated;
a cell frame at which the plurality of cylindrical secondary battery cells are disposed; and
a lid coupled to the cell frame and having a flame outlet,
wherein the cell frame includes:
a plurality of plate members bent along vertically extending fold lines to form a plurality of panels and coupled to intersect each other; and
a space formed between the plurality of plate members so that one of the plurality of cylindrical secondary battery cells is disposed therein, the space having an open top end,
wherein the plurality of plate members comprise:
a first cover bent to form at least one first space; and
a second cover coupled to the first cover and bent to form at least one second space,
wherein at least one downwardly extending fitting groove is formed in a top edge of a first panel of the first cover and at least one upwardly extending fitting groove is formed in a bottom edge of a first panel of the second cover,
wherein the top edge of the first cover forms a top edge of the first space and the bottom edge of the second cover forms a bottom edge of the second space, and
wherein the first panel of the first cover and the first panel of the second cover intersect at an angle.

2. The cylindrical secondary battery module according to claim 1, wherein the first cover and the second cover are coupled so that the at least one first space of the first cover and the at least one second space of the second cover are united to form at least one third space, and
wherein the at least one third space is the space formed between the plurality of plate members so that one of the cylindrical secondary battery cells is disposed in the at least one third space.

3. The cylindrical secondary battery module according to claim 2, wherein the third space has a polygonal shape.

4. The cylindrical secondary battery module according to claim 1, wherein the first cover is bent so that a plurality of first spaces are successively formed with a same pattern, and the second cover is bent so that a plurality of second spaces are successively formed with the same pattern.

5. The cylindrical secondary battery module according to claim 1, wherein the first cover and the second cover are formed with a same shape, and
wherein the first cover and the second cover are coupled so that the at least one first fitting groove of the first cover and the at least one second fitting groove of the second cover are disposed to face each other.

6. The cylindrical secondary battery module according to claim 1, wherein the cell frame is made of a mica material.

7. A secondary battery pack, comprising a cylindrical secondary battery module defined in claim 1.

8. A vehicle, comprising a cylindrical secondary battery module defined in claim 1.

* * * * *